United States Patent [19]

Schwaben et al.

[11] Patent Number: 4,839,418

[45] Date of Patent: Jun. 13, 1989

[54] THERMOPLASTIC MOLDING MATERIALS AND THEIR PREPARATION

[75] Inventors: Hans-Dieter Schwaben, Freisbach; Adolf Echte, Ludwigshafen; Rainer Bueschl, Roedersheim-Gronau; Rainer Schlichtmann, Ludwigshafen; Peter Klaerner, Battenberg; Hubert Kindler, Ludwigshafen, all of Fed. Rep. of Germany

[73] Assignee: BASF Aktiengesellschaft, Ludwigshafen, Fed. Rep. of Germany

[21] Appl. No.: 141,098

[22] Filed: Jan. 5, 1988

[30] Foreign Application Priority Data

Jan. 1, 1987 [DE] Fed. Rep. of Germany .... 3700332

[51] Int. Cl.$^4$ .................... C08F 279/02; C08L 53/02
[52] U.S. Cl. ...................... 525/53; 525/243; 525/98; 525/314
[58] Field of Search .................. 525/53, 315, 314, 98, 525/243

[56] References Cited

U.S. PATENT DOCUMENTS 3,658,946  4/1972  Bronstert et al. .
3,907,931  9/1975  Durst .................... 525/98
3,976,721  8/1976  Satake et al. ............ 525/314
4,282,334  8/1981  Walter et al. .

FOREIGN PATENT DOCUMENTS 1174214  4/1968  United Kingdom .

Primary Examiner—Wilbert J. Briggs, Sr.
Attorney, Agent, or Firm—Keil & Weinkauf

[57] ABSTRACT

A thermoplastic molding material contains, in each case based on the molding material comprising A+B, A from 80 to 60% by weight of a hard matrix composed of polystyrene and B from 20 to 40% by weight of a soft phase which is obtainable by polymerization of styrene in the presence of a linear styrene/butadiene block copolymer which has an ill defined transition, contains from 35 to 45% by weight of styrene and from 65 to 55% by weight of butadiene and has a block polystyrene content of from 25 to 35% by weight, the soft phase being uniformly distributed in the hard matrix and having a particle diameter of less than 0.8 μm.

The typical features of the said molding material are that the median particle diameter $d_{50}$ (volume average of the soft phase B is from 0.25 to 0.38 μm, the width of the particle size distribution, ($d_{95}$14 $d_5$), is from 0.2 to 0.6 μm, the $d_{60}$ value is from 0.26 to 0.40 μm and the $d_{90}$ value is from 0.40 to 0.75.

3 Claims, No Drawings

THERMOPLASTIC MOLDING MATERIALS AND THEIR PREPARATION

The present invention relates to a thermoplastic molding material containing, in each case based on the molding material comprising A+B, A from 80 to 60% by weight of a hard matrix composed of polystyrene and B from 20 to 40% by weight of a soft phase which is obtainable by polymerization of styrene in the presence of a linear styrene/butadiene block copolymer which contains from 35 to 45% by weight of styrene and from 65 to 55% by weight of butadiene, the soft phase being uniformly distributed in the hard matrix and having a particle diameter of less than 0.8 μm.

The relevant prior art includes
(1) British Pat. No. 1,174,214,
(2) U.S. Pat. No. 3,658,946, and
(3) U.S. Pat. No. 4,282,334

(1) describes impact-resistant and shock-resistant plastics which are based on polystyrene and whose soft phase contains cellular particles of different size ranges. Polystyrenes obtained by the process described in (1) have high impact strength but only poor gloss.

(2) describes a continuous process for the preparation of high impact polystyrene having cellular particle morphology, the said process being carried out in a cascade comprising 2 kettles and 2 towers. The products obtained have a smooth surface and a high gel content.

The skilled worker knows that, as a rule, high impact polystyrenes cannot be used for a large number of applications which require the combination of high gloss and high impact strength (for example toys, telephone housings, etc.). Thus, rubber-modified polystyrenes in which the soft component phase has a $d_{50}$ value (50% of the cumulative volume distribution) of less than 1 μm are obtained by a batchwise method using a styrene/butadiene two-block copolymer, by the process described in (3). Because of their particle size, moldings produced from these polystyrenes by injection molding have high gloss but the impact strength is unsatisfactory.

Due to this fact, ie. the lack of a combination of high gloss and high impact strength, it is evident that the requirement for high gloss, high impact strength and good translucence, as set, for example, for numerous food packagings, cannot currently be met by high impact polystyrene.

The user wishing to produce finished articles which have high gloss and at the same time high impactresistance must therefore rely on more expensive materials, for example styrene/acrylonitrile copolymers which are made impact-resistant using polybutadienes (ie. ABS polymers).

It is an object of the present invention to propose acrylonitrile-free styrene polymers which have been made impact-resistant using rubber and have high gloss, high impact strength and good translucence.

The present invention therefore relates to a thermoplastic molding material containing, in each case based on the molding material comprising A+B, A from 80 to 60% by weight of a hard matrix composed of polystyrene and B from 20 to 40% by weight of a soft phase which is obtainable by polymerization of styrene in the presence of a linear styrene/butadiene block copolymer which has al ill defined transition and contains from 35 to 45% by weight of styrene and from 65 to 55% by weight of butadiene, the soft phase being uniformly distributed in the hard phase and having a particle diameter of less than 0.8 μm.

In the molding material, the median particle diameter $d_{50}$ (volume average) of the soft phase B is from 0.25 to 0.38 μm, the width of the particle size distribution, $(d_{95}-d_5)$, is from 0.2 to 0.6 μm, the $d_{60}$ value is from 0.26 to 0.40 μm and the $d_{90}$ value is from 0.40 to 0.75.

It was known that the physical properties of high impact polystyrenes consisting of polystyrene with a soft phase dispersed therein depend to a great extent on the size of the particles of the soft phase and their structure.

Regarding the size of the particle, it is known that particles having a diameter greater than 1 μm contribute substantially to the impact strength but have a considerable adverse effect on the gloss of injection molded finished articles.

It is also known that smaller particles lead to high gloss but that articles injection molded from such products have a substantially lower impact strength than those which contain larger particles but have the same rubber content.

The properties of the novel molding materials may be characterized as follows:

1. The gloss of injection molded finished articles produced from these molding materials is from 78 to 82 scale divisions,
2. The translucence is from 2 to 4 and
3. The 50% damaging energy for injection molded finished articles is not less than 10 Nm.

The present invention furthermore relates to a process for the preparation of high impact polystyrene having the abovementioned properties by batchwise polymerization of a solution of a reaction mixture consisting of a) from 82 to 90% by weight of styrene and b) from 10 to 18% by weight of a linear styrene/butadiene block copolymer which has an ill-defined transition, containing from 35 to 45% by weight of styrene and from 65 to 55% by weight of butadiene. The process is carried out in the presence of conventional amounts of assistants and in the presence or absence of an initiator, in a cascade comprising two kettles, and, in the first kettle, the polymerization is carried out as a mass polymerization, at least until the end of phase inversion and up to a conversion of not more than 40% by weight, based on styrene, with stirring and with formation of the subsequent soft phase, and thereafter, in the second kettle, the polymerization is continued in suspension until complete conversion is achieved, the step being followed by conventional working up to obtain the desired product.

The composition of the novel molding material and the process for its preparation and the assistants required for this purpose are described below.

The novel molding material is composed of two phases and contains from 60 to 80, preferably from 65 to 75, % by weight of component A (hard matrix) and from 20 to 40, preferably from 35 to 25, % by weight of component B (soft phase); preferably, the molding material consists of these components.

Conventional additives (component C) are added during or after the preparation of the molding material, in particular for processing.

Component A

The hard matrix of the novel molding material is preferably composed exclusively of polystyrene, although it is also possible to use α-methylstyrene, p-methylstyrene, methyl methacrylate or mixtures of these. The viscosity number of the hard matrix is from 50 to 100, in particular from 60 to 90, ml/g (0.5% strength solution in toluene at 23° C.). This corresponds to mean molecular weights ($\overline{M}_w$) of from 126,000 to 210,000. The preparation of such polystyrenes and copolymers (also in the presence of rubber) is familiar to the skilled worker. In this context, it should be pointed out that neither the polystyrene occluded in the soft phase nor the grafted polystyrene is to be included in the hard matrix.

Component B

The novel molding material contains, as component B, a soft phase which is finely dispersed in the hard matrix. This soft phase can be detected in electron micrographs of the end product, the molding material. The soft phase is a graft polymer of a monomer of the hard matrix, in particular of styrene, which is grafted to a linear styrene/butadiene two-block copolymer.

Suitable linear styrene/butadiene two-block copolymers for the purposes of the present invention are the block copolymers which have an ill defined transition and are prepared by anionic polymerization using lithium initiators, the said block copolymers being obtained by polymerization of a mixture of the monomers butadiene and styrene in the absence of randomizers. The processes for the preparation of these linear two-block copolymers are familiar to the skilled worker. The amount of polybutadiene in these linear two-block copolymers is from 55 to 65, in particular from 58 to 62, % by weight. Accordingly, the amount of styrene is from 45 to 35, in particular from 42 to 38, % by weight. Since a certain amount of styrene is distributed in an ill defined manner in the polybutadiene segment along the block copolymer, the amount of block polystyrene in the two-block copolymer is from 25 to 35, preferably from 30 to 32, % by weight.

The molecular weight of the linear two-block copolymer is from 180,000 to 250,000, and that of the styrene block is from 50,000 to 70,000 (GPC values in each case, ie. weight average values).

An important factor for success, in addition to the use of special block copolymers, is that the soft phase has a special particle structure which results predominantly from capsular particles (preferably more than 90%, in particular more than 97% (number average)).

The particles of the soft phase have a diameter of less than 0.8 μm, the median particle diameter $d_{50}$ (volume average) of the soft phase B being from 0.25 to 0.38 μm. The width of the particle size distribution, ($d_{95}-d_5$) value, is from 0.2 to 0.6 μm, the $d_{60}$ value is from 0.26 to 0.40 μm and the $d_{90}$ value is from 0.40 to 0.75.

Component C

In addition to the components A and B, the novel molding material can contain from 1 to 40, preferably from 1 to 20, parts by weight of a component C per 100 parts by weight of A and B. This component C may be added to the reaction mixture at as early a stage as the preparation of the molding material, or may be mixed into the molding material for processing.

Components C are, for example, the assistants known for the preparation of the molding material of the present invention, such as mineral oils, conventional esters of aromatic or aliphatic carboxylic acids with aliphatic alcohols, polyalkylene oxides based on ethylene oxide and/or propylene oxide, molecular weight regulators, protective colloids, antioxidants, etc. Other assistants are lubricants, such as zinc stearate and other stearates, and other conventional assistants. For the production of moldings from the molding material, colorants, stabilizers and, if required, flameproofing agents may also be added, in the amounts familiar to the skilled worker.

Preparation of the Novel Molding Material

The preparation is preferably carried out by a batchwise polymerization of the monomer or monomers which form the hard matrix, in particular styrene, in the presence of the linear styrene/butadiene two-block copolymer. The polymerization can be carried out using regulators and the conventional initiators or by thermal initiation alone or mixed thermal/free radical initiation. The batchwise procedure is preferably carried out by a two-stage process, the first stage being effected in a conventional manner as a mass polymerization, if necessary with the use of a solvent, and the second stage being carried out in suspension. Batchwise processes are described in sufficient detail in German Published Application DAS 269 13 352 and U.S. Pat. No. 2,862,906, so that the skilled worker can rely on these.

In the preferred batchwise process, the first stage of which is carried out as a mass polymerization or, if required, in solution, the required morphology and distribution of the soft phase (rubber morphology) are obtained with the aid of shear forces (stirring). The temperatures in the first stage of the process are from 50° to 200° C. Conversions up to 40% by weight, based on styrene, are desirable. In the subsequent second stage, which is carried out in suspension, water and the conventional water-soluble suspending agents and, if required, initiators are added to the reaction mixture. Particularly suitable suspending agents are methylcellulose, oxypropylcellulose, polyvinyl alcohol, polyvinylpyrrolidone, etc.

Suitable solvents, which may or may not be used, are toluene, xylene, ethylbenzene, methyl ethyl ketone and the like. The stated solvents are used in amounts of from 2 to 25% by weight, based on styrene. If a solvent is used at all, ethylbenzene is preferred.

Suitable chain propagators are the conventionally used mercaptans of 4 to 18 carbon atoms. Of the stated mercaptans, n-butyl mercaptan, n-octyl mercaptan and n-and tert-dodecyl mercaptan have proven particularly useful. These mercaptans are used in amounts of from 0.01 to 0.3% by weight, based on styrene and are preferably employed in the first stage of the process or are already added to the reaction mixture.

Particularly suitable initiators are peroxides having half lives of from 5 minutes to 6 hours at 100° C. Specific examples are dibenzoyl peroxide, dilauryl peroxides and 1,1-di-tert-butylperoxy-3,3,5-trimethylcyclohexane, which are preferably added in the second stage of the process.

In the preparation of the novel molding materials, the median particle size $d_{50}$ is brought to 0.25–0.38 μm, and the claimed distribution of the particles is obtained, by shearing after phase inversion. This shearing to which the polymerizing solution is subjected is dependent to a great extent on the plant used for the polymerization.

When the process is transferred from one plant to another, for example from a smaller plant to a larger one, it is therefore always necessary to carry out a few exploratory experiments in order to determine the shearing conditions which lead predominantly to capsular particles having a $d_{50}$ value and a distribution in the claimed range. When such a transfer is made, it is necessary in particular to take into account the stirring speed, the type of stirrer, its geometry, its depth of immersion in the polymerizing solution, baffles in the stirred reactors, eg. flow breakers, etc. The same applies to extrapolation to a continuous process, as described in, for example, (2).

The parameters described in the Examples and Comparative Experiments were determined as follows:

1. The viscosity number, VN, of the hard matrix in ml/g is determined as described in DIN 53,724.

2. To evaluate the translucence TL, of the products obtained in the novel process, a scale is first set up. This scale comprises the values 1 to 9 in Table 1 below, the lower values representing good translucence. In order to obtain the values shown in Table 1, a commercial high impact polystyrene (product A) which contained 15% by weight of a styrene/butadiene block rubber having capsular particle morphology (Buna BL 6533 type) and containing 60% by weight of butadiene was used as a basis (rating 4). Blends of this product A in the weight ratios stated in Table 1 with commodity polystyrene of VM 96 [ml/g] gave the values of from 3 to 1 for the translucence. By mixing the stated commodity polystyrene with a high impact polystyrene having cellular particle morphology (product B, commerical product produced by thermal polymerization) and containing 8% by weight of polybutadiene, higher transluscence values were obtained (cf. the values 5 to 9 in the Table).

Pressed panels were produced from samples of the novel products of the Examples and of the Comparative Experiments and compared visually with the corresponding standard pressed panels of the scale.

TABLE 1

| Rating for the translucence | Mixing ratio in parts by weight | | |
|---|---|---|---|
| | Product A | Commodity polystyrene | Product B |
| 1 | 20 | 80 | 0 |
| 2 | 40 | 60 | 0 |
| 3 | 60 | 40 | 0 |
| 4 | 100 | 0 | 0 |
| 5 | 96 | 0 | 4 |
| 6 | 92 | 0 | 8 |
| 7 | 88 | 0 | 12 |
| 8 | 84 | 0 | 16 |
| 9 | 80 | 0 | 20 |

3. The gloss was measured for an angle of incidence of 45° on injection molded test boxes in the form of a truncated pyramid having a rectangular base by means of a laboratory reflectometer from Lange. This type of gloss measurement is a relative measurement. Its unit is stated in scale divisions (SCD), based on a standard supplied by Lange. The injection molding conditions selected were a melt (plastic) temperature of 280° C., a mold temperature of 40° C. and an injection time of 0.6 s. By way of illustration, gloss values of polystyrene products of the BASF range are stated in the Comparative Examples, the test boxes having been obtained under identical injection molding conditions.

4. The 50% damaging energy, $W_{50}$, in Nm from a falling bolt experiment according to DIN 53,443 at T=23° C. on the test boxes described under 3. is stated as a measure of the impact strength.

5. Thin-film electron micrographs of the products of the Examples and of Comparative Experiments were prepared in a conventional manner and used for determining the particle size and distribution of the soft phase.

The determination was carried out with the aid of image analysis by the method described by W. Alex in Zeitschrift fur Aufbereitung und Verfahrenstechnik 13 (1972), Section 3.11. The number of particles evaluated was from 4,000 to 9,500.

The median particle size stated in each case is the volume average of the particle size. Image analysis gives the integral volume distribution of the particle diameter of a sample. This makes it possible to determine the percentage by volume of the particles having a diameter equal to or smaller than a certain size. The median particle diameter, also referred to as the $d_{50}$ value of the integral volume distribution, is defined as the particle diameter at which 50% by volume of the particles having a smaller diameter than the diameter corresponding to the $d_{50}$ value. In this case, 50% by volume of the particles likewise have a larger diameter than that corresponding to the $d_{50}$ value. To characterize the particle size distribution of the rubber particles, the $d_5$ and $d_{95}$ values likewise obtained from the integral volume distribution are used in addition to the $d_{50}$ value (median particle diameter). The $d_5$, $d_{60}$, $d_{90}$ and $d_{95}$ values of the integral volume distribution are defined in the same way as the $d_{50}$ value, except that they are based on 5, 60, 90 and 95% by volume, respectively, of the particles.

To carry out the Examples and for comparative purposes, the following products were used:

K: The rubber (elastomeric grafting base) used was a commerical product, Buna BL 6533. This was a linear styrene/butadiene two-block copolymer which had an ill defined transition and contained about 42% by weight of styrene and 58% by weight of butadiene, the amount of block polystyrene being about 31% by weight. The total molecular weight (GPC) was 205,000, and that of the styrene block was 60,000.

For comparison purposes, the products A, B and C were used. These are commercial products of BASF AG which have different morphologies and each contain about 8.1% by weight of rubber, calculated as pbu.

A: High impact polystyrene 525 K having capsular particle morphology and a $d_{50}$ value of 0.29 μm, prepared by a continuous process as described in Example 3 of Publication (3). VN=78 ml/g.

B: High impact polystyrene 576 H having cellular particle morphology and a $d_{50}$ value of 0.71 μm. VN=70 ml/g.

C: High impact polystyrene 586 G having cellular particle morphology and a $d_{50}$ value of 1.1 μm. VN=70 ml/g.

The Examples and Comparative Experiments below illustrate the invention. Parts and percentages are by weight, unless stated otherwise.

EXAMPLES 1 AND 2

The polymerization was carried out batchwise on a 10 kg scale by a mass/suspension process in a two-kettle cascade consisting of the kettles A and B. In kettle A (~b 20 1 capacity, 304 mm diameter, 300 mm height), the prepolymerization of the solution of rubber in styrene is carried out under isothermal conditions, while stirring. 0.1 part of tert-dodecyl mercaptan, as a molecular weight regulator, 2.3 parts of ®Minog 70, as a mineral oil, and 0.12 part of ®Irganox 1076 (a sterically hindered phenol), as an antioxidant, were added to each of the two polymerization mixtures, the amounts being based on 100 parts of styrene and rubber. 85% by weight of styrene and 15% by weight of rubber were used as the reaction mixture in each case. The stated mixture of styrene, elastomeric grafting base and additional mineral oil, antioxidant and regulator was introduced into the kettle in an amount of 12,000 g. If the density of styrene is taken as 0.906 g/cm$^3$ at 20° C., this gives a kettle charge of about 66% by volume at 20° C. The stirrer used was an anchor stirrer having a diameter of 285 mm, a shaft diameter of 28 mm and a blade length of 210 mm, the distance from the stirrer to the bottom of the kettle being 20 mm. Hence, for a charge height of 215 mm at room temperature, the depth of immersion of the stirrer was 195 mm.

The solution was stirred at 123° C. until a conversion of 35±1% was reached, stirring being carried out at speeds of 55 (Example 1) and 65 min$^{-1}$ (Example 2).

In kettle B, which was likewise equipped with an anchor stirrer and had a capacity of 40 l, 18,000 g of water, 180 g of ®Luviskol K 90, a protective colloid based on ethylene oxide, and 18 g of sodium pyrophosphate were introduced and brought to about 100° C. When, in kettle A, the conversion had increased to 35±1%, based on the styrene, 0.1 part, based on the total mixture, of dicumyl peroxide was added. The stirrer speed in kettle B was then brought to 300 min$^{-1}$, and the content of kettle A was forced into kettle B in the course of not more than 15 minutes by means of nitrogen, via a connecting tube. Polymerization was then carried out in the aqueous suspension prepared in this manner, in each case under isothermal conditions for 6 hours at 130° C. and for 6 hours at 140° C. until a conversion of more than 99%, based on styrene, was reached. After this time, the kettle content was cooled to 30° C., discharged, washed thoroughly with water and then dried for 24 hours at 60° C. in a drying oven under a reduced pressure of 20 mmHg. Compounding was then carried out by means of an extruder (ZSK 30, Werner+Pfleiderer) in order to convert the product into granular form.

Viscosity numbers of the hard matrix, gloss, translucence and impact strength are shown in Table 2. The properties of the products A, B and C have also been included and, where necessary (product A), have been supplemented by the particle diameters obtained by image analysis.

When the gloss, translucence and impact strength of the novel molding materials are compared with the values for the commercial products A, B and C, a substantial increase in impact strength is observed, accompanied by a sharp fall in gloss and translucence.

TABLE 2

| | | | | Diameter of the soft phase according to image analysis, in [$\mu$m] | | | | | | |
|---|---|---|---|---|---|---|---|---|---|---|
| | VN | Gloss SCD | TL SCD | W$_{50}$ Nm | d$_{50}$ | d$_{95}$ | d$_5$ | (d$_{95}$ − d$_5$) | d$_{60}$ | d$_{90}$ |
| Example | | | | | | | | | | |
| 1 | 69.8 | 79.5 | 2.5 | 31.2 | 0.32 | 0.64 | 0.21 | 0.43 | 0.34 | 0.50 |
| 2 | 68.4 | 79.1 | 3 | 26.5 | 0.28 | 0.52 | 0.19 | 0.33 | 0.31 | 0.48 |
| Comparative Sample | | | | | | | | | | |
| A | 78 | 80.3 | 4 | 0.2 | 0.29 | 0.38 | 0.21 | 0.17 | 0.30 | 0.35 |
| B | 70 | 70.0 | >9 | 9.6 | 0.71 | — | — | — | — | — |
| C | 70 | 61.1 | >9 | 36.5 | 1.1 | — | — | — | — | — |

We claim:

1. A thermoplastic molding material consisting essentially of
   from 80 to 60% by weight of a hard matrix (A) composed of polystyrene and
   from 20 to 40% by weight of a soft phase (B), the soft phase (B) being uniformly distributed in the hard phase and having a particle diameter of less than 0.8 $\mu$m, its median particle diameter d$_{50}$ (volume average) being from 0.25 to 0.38 $\mu$m, the width of the particle size distribution, (d$_{95}$–d$_5$), being from 0.2 to 0.6 $\mu$m, the d$_{60}$ value being from 0.26 to 0.40 $\mu$m and the d$_{90}$ value being from 0.40 to 0.75, said molding material being obtained by batchwise polymerization of a solution of from 10 to 18% by weight of a linear styrene/butadiene block copolymer having an ill defined transition, containing from 35 to 45% by weight of styrene and from 65 to 55% by weight of butadiene and having a block polystyrene content of from 25 to 35% by weight, in from 82 to 90% by weight of styrene in the presence of conventional amounts of assistants in a cascade consisting of 2 kettles, wherein, in the first kettle, the polymerization is carried out as a mass polymerization, at least up to the end of phase inversion and up to a conversion of not more than 40% by weight, based on styrene, with stirring and with formation of the subsequent soft phase, and thereafter, in the second kettle, the polymerization is continued in suspension until complete conversion is achieved, these steps being followed by conventional working up to obtain the desired product.

2. A thermoplastic molding material as defined in claim 1 containing, in each case based on the molding material comprising A+B,
   A from 80 to 60% by weight of a hard matrix composed of polystyrene and
   B from 20 to 40% by weight of a soft phase which is obtainable by polymerization of styrene in the presence of a linear styrene/butadiene block copolymer which has an ill defined transition and contains from 38 to 42% by weight of styrene and from 62 to 58% by weight of butadiene and has a block polystyrene content of from 25 to 35% by weight, the soft phase being uniformly distributed in the hard phase and having a particle diameter of less than 0.8 $\mu$m,
wherein the median particle diameter d$_{50}$ (volume average) of the soft phase B is from 0.25 to 0.38 $\mu$m, the width of the particle size distribution, (d$_{95}$–d$_5$), is from 0.2 to 0.6 μm, the $d_{60}$ value is from 0.26 to 0.40 μm and the $d_{90}$ value is from 0.40 to 0.75.

3. A thermoplastic molding material as defined in claim 1 containing, in each case based on the molding material comprising A+B A from 80 to 60% by weight of a hard matrix composed of polystyrene and B from 20 to 40% by weight of a soft phase which is obtainable by polymerization of styrene in the presence of a linear styrene/butadiene two-block copolymer which has an ill defined transition and contains from 38 to 42% by weight of styrene and from 62 to 58% by weight of butadiene and has a block polystyrene content of from 30 to 32% by weight and whose mean molecular weight is from 180,000 to 250,000, the molecular weight of the styrene block being from 50,000 to 70,000 and the soft phase being uniformly distributed in the hard matrix and having a particle diameter of less than 0.8 μm, wherein the median particle diameter $d_{50}$ (volume average) of the soft phase B is from 0.25 to 0.38 μm, the width of the particle size distribution, $(d_{95}-d_5)$, is from 0.2 to 0.6 μm, the $d_{60}$ value is from 0.26 to 0.40 μm and the $d_{90}$ value is from 0.40 to 0.75.

* * * * *